United States Patent [19]

Kuehle et al.

[11] Patent Number: 5,129,490
[45] Date of Patent: Jul. 14, 1992

[54] DEVICE FOR DAMPING COURSES OF MOTION BETWEEN TWO SUSPENSION POINTS

[75] Inventors: Walter Kuehle, Neckarwestheim; Roland Moennings, Stuttgart; Udo Neumann, Leonberg, all of Fed. Rep. of Germany

[73] Assignee: Robert Bosch GmbH, Stuttgart, Fed. Rep. of Germany

[21] Appl. No.: 657,988

[22] Filed: Feb. 21, 1991

Related U.S. Application Data

[63] Continuation of Ser. No. 344,931, Apr. 28, 1989, abandoned.

[30] Foreign Application Priority Data

Apr. 29, 1988 [DE] Fed. Rep. of Germany ....... 3814480

[51] Int. Cl.$^5$ .................................................. F16F 9/34
[52] U.S. Cl. .................................... 188/299; 137/599; 137/870; 188/282; 188/317; 188/319; 188/322.15; 251/129.1; 251/129.21; 251/129.08; 280/714
[58] Field of Search ............. 188/299, 319, 322.15, 188/282, 317; 251/129.1, 129.21, 129.08; 280/714; 137/599, 870

[56] References Cited

U.S. PATENT DOCUMENTS

| | | | |
|---|---|---|---|
| 3,419,113 | 12/1968 | Shelley | 188/282 X |
| 4,504,039 | 3/1985 | Akagi | 251/129.21 X |
| 4,726,453 | 2/1988 | Obstfelder et al. | 188/299 X |
| 4,786,034 | 11/1988 | Heess et al. | |
| 4,838,392 | 6/1989 | Miller et al. | 251/129.08 X |
| 4,893,699 | 1/1990 | Engelsdorf et al. | 188/299 |
| 4,923,038 | 5/1990 | Lizell | 188/299 |
| 4,936,423 | 6/1990 | Karnopp | 188/299 |
| 4,974,707 | 12/1990 | Neumann et al. | 188/299 |

FOREIGN PATENT DOCUMENTS

| | | | |
|---|---|---|---|
| 221602 | 5/1987 | European Pat. Off. | 188/319 |
| 3518327 | 11/1986 | Fed. Rep. of Germany | 188/322.15 |
| 3542097 | 6/1987 | Fed. Rep. of Germany | 188/299 |
| 3621709 | 3/1988 | Fed. Rep. of Germany | 188/319 |
| 3637714 | 7/1988 | Fed. Rep. of Germany | |
| 3635894 | 5/1989 | Fed. Rep. of Germany | |
| 2126687 | 3/1984 | United Kingdom | 188/282 |

Primary Examiner—George A. Halvosa
Attorney, Agent, or Firm—Edwin E. Greigg; Ronald E. Greigg

[57] ABSTRACT

A shock absorber in which a damping force is to be adjusted separately for the tension and the compression directions in which the shock absorber is equipped with separate throttle valves, one for basic damping and one for supplementary damping. In the device, the adjustable parts of the two throttle valves are embodied in the form of magnetically controllable coaxial sheaths. This results in an especially space-saving design, the sheaths and magnetic coils which can be integrated directly into a piston (5) of the shock absorber. The device is used for damping relative motions of two masses, in particular in resilient wheel suspension systems in vehicles.

15 Claims, 2 Drawing Sheets

DEVICE FOR DAMPING COURSES OF MOTION BETWEEN TWO SUSPENSION POINTS

This is a continuation of copending application Ser. No. 344,931, filed on Apr. 28, 1989, abandoned.

BACKGROUND OF THE INVENTION

The invention relates to a device for damping courses of motion. In a known device of this type, with a suspension system for two masses, where one of them may be one or more wheels of a vehicle and the other a vehicle body, a device with which the damping can be varied by control signals by means of a valve device is disposed between the two masses. The valve device is subdivided into one valve assembly for a basic damping and one valve assembly for a supplementary damping. The valve assembly for the basic damping and that for the supplementary damping are connected in line with one another. Both valve assemblies are triggered by control signals. The control signals for the basic damping here signify a slow, adaptive adaptation of a damping component, for instance for varying the wheel behavior as a function of road conditions, while the control signals for the supplementary damping contrarily relate to a faster adjustment of a different damping component, which for instance varies the motions of the vehicle body, to optimize ride comfort, as a function of absolute velocities and of up-and-down, pitch, and roll motions. The overall result is what is known as semiactive damping action in the system.

OBJECT AND SUMMARY OF THE INVENTION

The device according to the invention has the advantage over the prior art that by embodying the basic damping throttle valve and the supplementary damping throttle valve each in the form of one or more sheaths, a particularly small, lightweight and economically manufactured valve device is obtained.

It is particularly advantageous that the sheaths may be of various diameters, so that they can be displaced coaxially with one another and inside one another to a variable extent. Because of the small, compact structure, the valve device can be integrated with the pistons that divide the work chambers.

The invention will be better understood and further objects and advantages thereof will become more apparent from the ensuing detailed description of a preferred embodiment taken in conjunction with the drawing.

DESCRIPTION OF THE PREFERRED EMBODIMENT

Figure 1:
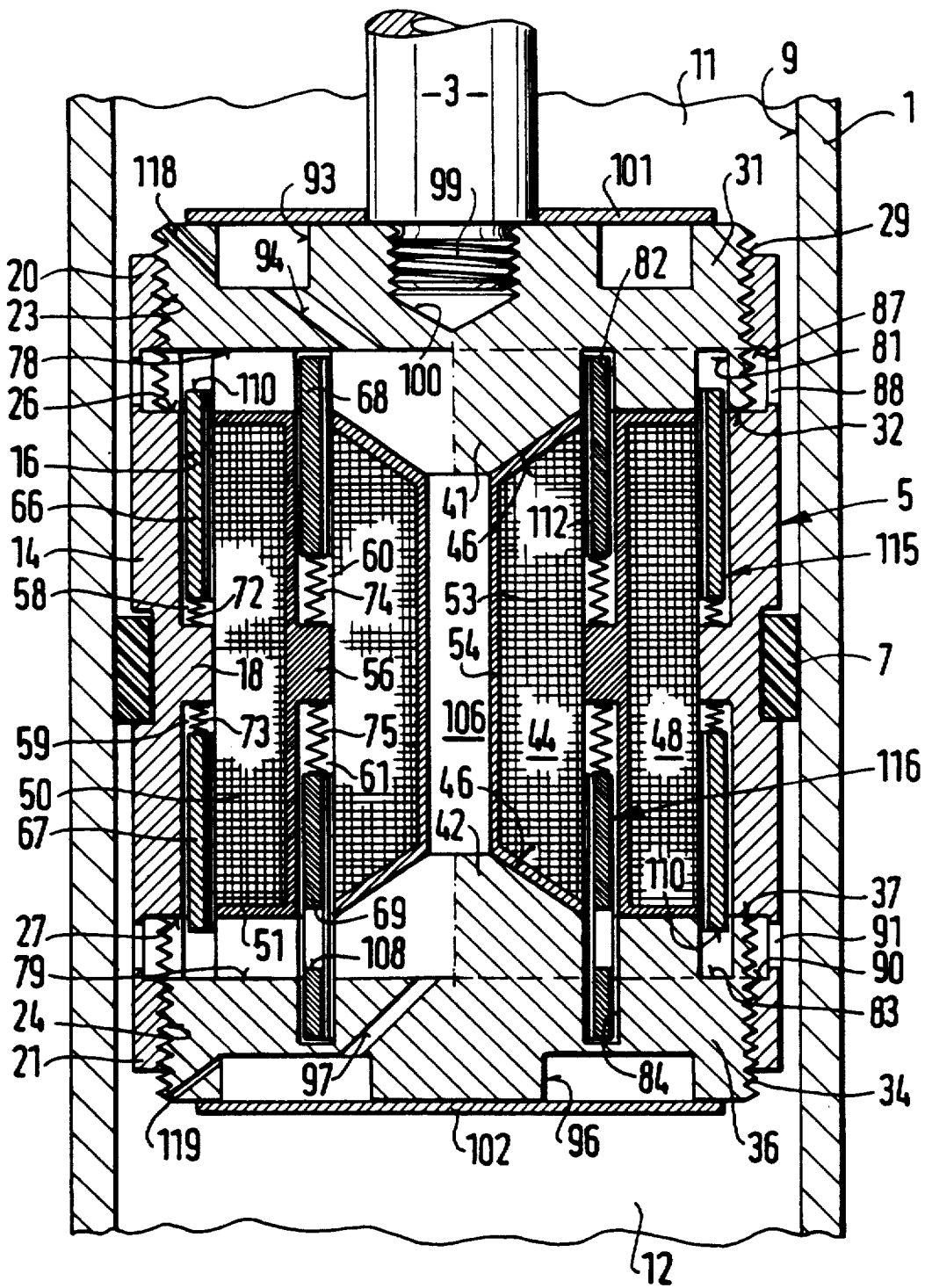
FIG. 1 shows an exemplary embodiment of the invention in simplified fashion.

The drawing shows a detail of a shock absorber having a device according to the invention for damping courses of motion between two suspension points. The shock absorber comprises a cylinder, having a cylindrical jacket tube 1 shown in part, with two face ends, not shown. One face end is secured to a vehicle axle, not shown; a piston rod 3 protrudes outward on the other face end of the jacket tube 3 and engages a vehicle body, also not shown. The only part of the piston rod 3 that is shown here is the end remote from the vehicle body. The piston rod 3 is connected on this end to a cylindrical piston 5, which via an interposed seal 7 seated in an annular groove can slide axially on an inner jacket face 9 of the jacket tube 1.

The interior of the jacket tube 1 is divided by the piston 5 into a first work chamber 11 and a second work chamber 12.

The piston 5 comprises, among other elements, a tubular piston housing 14. On an inner face 16 of the piston housing 14, a cylindrical step 18 protrudes from the inner face 16 into the interior of the piston housing 14. The tubular piston housing 14 has internal threads 23 and 24 and one step or shoulder 26 and 27 on each of its two ends 20 and 21. A first end plate 31 is provided with an external thread 29 which is screw threaded into one internal thread 23, until one face end 32 of the first plate 31 comes to rest on the step 26. A second end plate 36 is likewise provided with an external thread 34 which is screw threaded into the internal thread 24 on the second end 21 of the piston housing 14, until one face end 37 of the end plate 36 comes to rest on the second step 27. One centering cone 41 and 42 is located on each of the two plates 31 and 36, the side of the associated plate that faces the other plate. An inner magnet coil 44 is located between the centering cones 41 and 42. The magnet coil 44 has two conical face ends 46. The two centering cones 41 and 42 and the conical face ends 46 of the magnet coil 44 center this coil in the center of the piston coaxial with the housing 14. An outer magnet coil 48 is disposed between the piston housing 14, the inner magnet coil 44, the first plate 31 and the second plate 36. The location of the outer magnet coil 48 is fixed in the radial direction by the cylindrical step 18 of the piston housing 14 on the one hand and by the inner magnet coil 44 on the other. In the axial direction, the outer magnet coil 48 is retained by the face end 32 of the plate 31 on one end and by the face end 37 of the plate 36 on the other. The outer magnet coil 48 substantially comprises a coil 50 and a housing 51, and the inner magnet coil 44 likewise substantially comprises a coil 53 and a housing 54. A step 56 is located on the housing 51 of the outer magnet coil 48, facing the inner magnet coil 44. A first co-axially directed cylindrical hollow space 58 is formed between the inner face 16 of the piston housing 14, the step 18, the outer magnet coil 48 and the first end plate. A second co-axially directed cylindrical hollow space 59 is defined by the inner face 16 of the piston housing 14, the cylindrical step 18, the outer magnet coil 48 and the second end plate 36. A third cylindrical hollow space 60 is formed between the housing of outer magnet coil 48, the step 56 on the inner surface of the housing 51, the inner magnet coil 44 and the first plate 31; and finally, a fourth cylindrical hollow space 61 is formed between the housing of outer magnet coil 48, the step 56, the inner magnet coil 44 and the second plate 36. A first sheath 66 is disposed in the first cylindrical hollow space 58, and a first spring 72 is disposed between the first sheath and the step 18. Similarly, a second cylindrical sheath 67 is disposed in the second cylindrical hollow space 59, a third cylindrical sheath 68 is disposed in the third cylindrical hollow space 60, and a fourth cylindrical sheath 69 is disposed in the fourth cylindrical hollow space 61. A second spring 73 is located between the second sheath 67 and the step 18; a third spring 74 is located between the third sheath 68 and the step 56, and finally a fourth spring 75 is located between the fourth sheath 69 and the step 56. The springs 72 and 74 press the first and third sheaths 66, 68 toward the first end plate 31, and the springs 73 and 75 press the second sheath 67 and the fourth sheath 69 toward the second end plate 36. A radial conduit 78 is machined into the first end plate 31, and a radial conduit 79 is likewise machined into the second end plate 36. Instead of only one conduit 78 and 79 per plate, a plurality of conduits could be provided.

The section through the piston 5 that is shown in the drawing is selected such that on the left side of the drawing the section passes through the two radial conduits 78 and 79, while on the right, the section through the two end plates 31 and 36 is instead such that the radial conduits 78 and 79 are behind the plane of the section and thus are only suggested there in the form of a broken line.

The first end plate 31 is provided with a first axial plunge cut 81 and a second plunge cut 82, into which the first sheath 66 and the third sheath 68, respectively, can plunge to a variable depth into the first end plate 31. The second end plate 36 is similarly provided with two plunge cuts 83 and 84, into which the second and fourth sheaths 47 and 69, respectively, can plunge to a variable depth into the second end plate. Via an encompassing undercut 87 and one or more radial openings 88 in the piston housing 14, there is an operative connection between the radial conduit 78 of the first end plate 31 and the first work chamber 11, and through a further encompassing undercut 90 and one or more further radial openings 91 in the piston housing 14, there is an operative connection between the radial conduit 79 of the second plate 36 and the second work chamber 12. An annular groove 93 is machined into the first end plate 31, oriented toward the first work chamber 11. Via a conduit 94, there is communication between the annular groove 93 and the radial conduit 78. An annular groove 96 is likewise machined into the second end plate 36, oriented toward the second work chamber 12, and a conduit 97 connects the annular groove 96 with the radial conduit 79. Instead of only one conduit 94 and 97 per plate, each plate could have a plurality of conduits 94 and 97, though this is not shown here. By screwing a threaded tang 99, provided on the piston rod 3, into a threaded bore 100 in the first end plate 31, the piston rod 3 is connected to the first end plate 31 and thus to the piston 5.

A first check valve 101 is disposed between the annular groove 93 of the first end plate 31 and the first work chamber 11. In the exemplary embodiment shown, this check valve 101 is in the form of a leaflet, which depending on the pressure difference between the work chamber 11 and the annular groove 93 enables a flow of the pressure fluid out of the groove 93 into the first work chamber 11 but prevents the pressure fluid flow in the opposite direction. A further check valve 102 is also disposed between the annular groove 96 and the further work chamber 12 and likewise permits the flow of the pressure fluid out of the groove 96 into the work chamber 12, but not in the opposite direction depending upon the pressure difference. Fastening elements for joining the check valves 101 and 102 to the respective plates 31 and 36 are not shown in the drawing, for the sake of simplicity.

In the inner magnet coil 44, an inner through axial bore 106 is provided, which provides a passage between the two hollow spaces, formed by the radial conduits 78 and 79, adjoining the end faces 46 of the inner magnetic coil 44. One or more transverse holes 108 are machined into the fourth cylindrical sheath 69. From the vehicle body, an electric supply line extends through the hollow piston rod 3 and through the plate 31 to the two magnet coils 44 and 48. For the sake of simplicity, however, this supply line is not shown.

Figure 2:
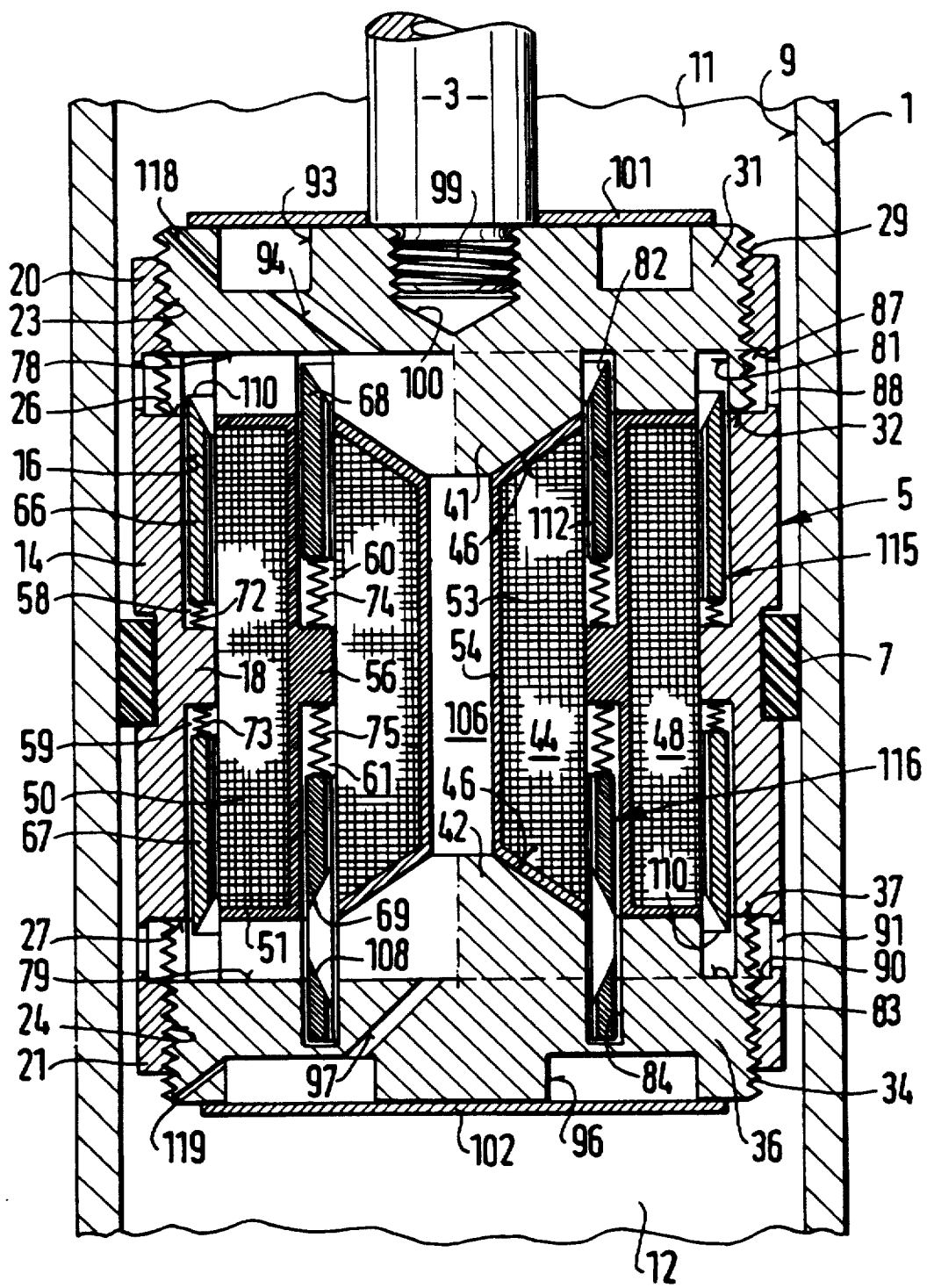
FIG. 2 is a modification of the embodiment shown in FIG. 1.

As a function of control signals, the magnet coils 44 and 48 are capable of generating a variably great magnetic force. The outer magnet coil 48 can act upon the two sheaths 66 and 67, and the inner magnet coil 44 can act upon the two sheaths 68 and 69. Depending on the magnitude of the control signals, the sheaths 66-69 are attracted more or less toward the steps 18 and 56, counter to the forces of the springs 72-75. By a suitable selection of the material for the housing 51 of the magnet coil 48, it is assured that the magnetic force of the outer magnet coil 48 can act substantially only on the first and second sheaths 66 and 67. The radial conduit 78 is opened to a variable extent depending on the position of the sheaths 66 and 68, and the radial conduit 79 is likewise opened to a variable extent depending on the position of the sheaths 67 and 69. For the sheaths 66-68, the pressure fluid flows in the remaining open portion of the radial conduits 78 and 79 in the radial direction, via a respective face end 110 of each of the sheaths 66-68. For the fourth sheath 69, the pressure fluid flows through the variably open transverse holes 108. To equalize the pressure at the sheaths 66-69, or in other words so that, in the part of the hollow spaces 58-61 in which the springs 72-75 are located, the pressure fluid can flow in and out upon displacement of the sheaths 66-69, the width of the walls of these sheaths is sufficiently smaller than the width of the hollow spaces 58-61, or else longitudinal grooves 112 are machined into the sheaths. The cross sections of the walls of the sheaths 66-69 are of uniform width over their entire length, in the exemplary embodiment shown. The modification shown by FIG. 2 lessens the axial hydraulic forces upon the sheaths 66-69, however, they may be embodied such that their walls have a blade-like course in the direction toward the face ends 110. The wall of the fourth sheath 69 may also taper off entirely or partly in blade-like fashion in the region around the transverse hole 108. By embodying the walls of the sheaths 66-69 in blade-like fashion in the vicinity of the narrowest cross sections, the surface areas that can be engaged by flow forces of the pressure fluid are reduced in size.

The outer magnet coil 48, the first sheath 66 and the second sheath 67, in cooperation with the radial conduits 78 and 79, form a so-called basic damping throttle valve 115. The inner magnet coil 44, the third sheath 68 and the fourth sheath 69, in cooperation with the radial conduits 78 and 79, form a so-called supplementary damping throttle valve 116. Depending on the position of the sheaths 66-69, there is a variably throttling connection for the pressure fluid from the first work chamber 11 through the opening 88, the encompassing undercut 87, through the radial conduit 78, past the end faces 110 of the sheaths 66 and 68, through the through bore 106, through the radial conduit 79, through the transverse holes 108, past the end face 110 of the sheath 67, through the encompassing undercut 90 and through the opening 91 in the second work chamber 12. From the radial conduit 79, a flow into the second work chamber 12 that bypasses the throttling of the sheaths 67 and 69 is possible through the conduit 97, the groove 96 and the second check valve 102. A flow is likewise possible from the second work chamber to the first work chamber 11 through the opening 91, the encompassing undercut 90, and the radial conduit 79, past the end face 110 of the second sheath 67, and through the transverse holes 108 in the fourth sheath 69, the through bore 106, and the radial conduit 78, past the end faces 110 of the first and third sheaths 66 and 68, and through the encompassing undercut 87 and the opening 88. From the radial conduit 78, the pressure fluid can also flow, bypassing the throttling of the sheaths 66 and 68, into the first work chamber 11 through the conduit 94, the groove 93 and the first check valve 101.

Depending on the relative motion between the piston 5 and the jacket tube 1, the pressure of the pressure fluid in the first work chamber 11 is higher or lower than that in the second work chamber 12. Regardless of whether the higher pressure prevails in the first work chamber 11 and the pressure fluid flows out of the first work chamber 11 into the second work chamber 12, or the higher pressure prevails in the second work chamber 12 and the pressure fluid flows out of the second work chamber 12 into the first work chamber 11, the pressure medium still must flow through the operative region of the basic damping throttle valve 115. This basic damping throttle valve 115 is operative in both flow directions of the pressure fluid.

If the supplementary damping throttle valve 116 is in a position as shown in the drawing, then the pressure fluid is throttled relatively strongly at the third sheath 68 in the radial conduit 78 and relatively weakly at the fourth sheath 69 in the radial conduit 79. If the pressure fluid now flows through the opening 88 and through the radial conduit 78 toward the second work chamber 12, then it is throttled relatively strongly at the face end 110 of the third sheath 68. In the reverse direction, if it flows out of the second work chamber 12 via the opening 91, through the radial conduit 79, the transverse hole 108, the through bore 106, the middle portion of the radial conduit 78, the conduit 94, the groove 93 and the first check valve 101 into the first work chamber 11, then the pressure medium is only relatively slightly throttled. If there is a relatively strong current in the inner magnet coil 44, the two sheaths 68 and 69 of the supplementary damping throttle valve 116 are in the position in which the third sheath 68 leaves the radial conduit 78 relatively wide open, but the transverse hole 108 of the fourth sheath in the vicinity of the radial conduit 79 is relatively extensively closed. In this position of the sheaths 68 and 69 of the supplementary damping throttle valve 116, the supplementary damping throttle valve 116 throttles the flow of the pressure fluid from the first work chamber 11 into the second work chamber 12 relatively little, but throttles the flow of the pressure fluid from the second work chamber 12 into the first work chamber 11 relatively strongly.

If there is no current, or only weak current, in the magnet coil 48 of the basic damping throttle valve 116, then the pressure fluid is throttled relatively strongly both when it flows out of the first work chamber 11 into the second work chamber 12, and when it flows out of the second work chamber into the first. With strong current in the magnet coil 48, the pressure fluid is throttled relatively weakly by the basic damping throttle valve 115 in both flow directions. Depending on the triggering of the inner magnet coil 44 and thus on the position of the two sheaths 68 and 69, the supplementary damping throttle valve 116 is sometimes more forceful with a flow direction of the pressure fluid from the first work chamber 11 into the second work chamber 12, and sometimes more when the flow direction of the pressure fluid is from the second work chamber 12 into the first work chamber 11. By means of the above-described combination of the two valves 115 and 116, in cooperation with the two check valves 101 and 102, the throttling of the pressure fluid can be adjusted arbitrarily, within wide limits, in both flow directions independently of one another.

The basic damping throttle valve 115 may be selectively embodied such that with a certain current in the outer magnet coil 48, the pressure fluid either is throttled equally strongly when the flow direction is from the first work chamber 11 into the second work chamber 12 past the first sheath 66 as in the reverse flow direction past the second sheath 67, or is throttled unequally strongly in the two directions.

If a particular, so-called basic damping is required, it is attained substantially by supplying appropriate current to the magnet coil 48 of the basic damping throttle valve 115. The supplementary damping throttle valve then occupies an approximately middle position. On the other hand, if it is intended that the damping in one flow direction should be greater than in the other, then the basic damping for both directions is generated primarily by the basic damping throttle valve 115, and the additional amount for the one direction is furnished by suitable triggering of the supplementary damping throttle valve 116.

When the magnet coils 44 and 48 are triggered with certain control signals, the throttling of the pressure fluid by the sheaths 66–69 is determined not only by a length of these sheaths, but also by the springs 72–75, among other factors. A spring having a different spring characteristic can be selected for each sheath. Each of the springs 72–75 may comprise a plurality of individual springs.

By equipping the basic damping throttle valve 115 and supplementary damping throttle valve 116 with the sheaths 66–69 and with the sheath-like magnet coils 44 and 48, a particularly compact and simple design is possible. Because of this compact design, both throttle valves 115 and 116 can be accommodated in the piston 5. Between the sheaths 66–69, a relatively large space is available for intalling the magnet coils 44 and 48, so that to generate large magnetic forces, the magnet coils can be made relatively large in size. Large magnetic forces make for favorable adjustment times. It is particularly advantageous if the magnet coils 44 and 48 are disposed coaxially with the sheaths 66–69, and the sheaths in turn are disposed coaxially with the piston 5.

In the exemplary embodiment shown, the two throttle valves 115 and 116 are fastened in place in the piston housing 14 simultaneously with the assembly of the plates 31 and 36. To compensate for manufacturing tolerances, it may possibly be necessary to build in other elastic components, but they are not shown in the drawing.

In an emergency as well, for instance if one of the magnet coils 44 or 48 fails, the connection between the two work chambers 11 and 12 should not be completely closed. There are various possible ways to assure this: For instance, the plate 31 can be provided with a bore 118 and the plate 36 with a bore 119, or the check valves 101 and 102 can be embodied such that a certain flow is allowed even in the opposite direction from the primary flow direction, or the face end 110 of the sheaths 66–69 can be provided with variously large notches, so that the flow through the radial conduits 78 and 79 cannot be closed completely (although this is not shown), or the travel of the sheaths 66–69 can be limited by a stop, for instance by making the axial depth of at least some of the plunge cuts 81–84 less than the depth of the radial conduits 78 and 79, so that the flow through the radial conduits 78 and 79 cannot be closed off completely (again, this is not shown here).

As is sometimes done, it is also possible with this device to embody the plate 36 like the plate 31, so that a piston rod can be attached on that end as well. If both piston rods have the same diameter, the volume positively displaced into one work chamber or the other, 11 or 12, upon a relative motion between the piston 5 and the jacket face 1, is equal to the volume received in the other of the two work chambers.

Disposing two throttle valves as described above, that is, the basic damping throttle valve 115 and the supplementary damping throttle valve 116, instead of only one, means that if a different damping is desired in the two flow directions, an adjustment need not be performed each time the flow direction is reversed. As a result, the limit frequency for the two throttle valves, even in the case of a relatively high-frequency change in direction of the relative motion between the piston 5 and the jacket tube 1, can be selected to be relatively low, which considerably simplifies the entire apparatus.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. A device for damping courses of motion of two bodies or masses moving relative to one another and at variable speeds in their absolute positions, such as damping wheel suspension systems in vehicles, which comprises a cylinder, a piston displaceable in said cylinder, said piston divides said cylinder into first and second work chambers, said cylinder and the piston are each connected to one of the bodies, at least one valve device included in said piston for varying the flow of a pressure fluid out of one work chamber into the other work chamber, said at least one valve device is optionally triggered by control signals for operation thereof, said at least one valve device includes at least one basic damping throttle valve (115) which performs a basic damping function, at least one supplementary damping throttle valve (116) which performs a supplementary damping function, and a plurality of check valves (101, 102) which permit fluid flow from one work chamber to the other work chamber, wherein all fluid flow connections of the throttle and check valves from the work chambers are at least indirectly joined together with a flow chamber (106), and said throttle valves (115 and 116) are each equipped with one or more displaceable sheaths (66, 67, 68, 69), at least some of said sheaths (66, 67, 68, 69) have different diameters and at least some of said sheaths are displaced partway inside one another.

2. A device as defined by claim 1, in which said sheaths (66, 67, 68, 69) are disposed coaxially with one another.

3. A device as defined by claim 2, in which said sheaths (66, 67, 68, 69) are actuabtable by cylindrically embodied magnet coils (44 and 48).

4. A device as defined by claim 3, in which said magnet coils (44 and 48) are disposed coaxially with the sheaths (66, 67, 68, 69).

5. A device as defined by claim 4, which includes at least one transverse hole (108) in a wall of at least one of the sheaths (66, 67, 68, 69).

6. A device as defined by claim 5, in which the wall of at least one sheath in the vicinity of at least one transverse hole (108) tapers off at least partly in blade-like fashion.

7. A device as defined by claim 1, inw hich said sheaths (66, 67, 68, 69) are disposed in the piston (5).

8. A device as defined by claim 7, in which said sheaths (66, 67, 68, 69) are actuatable by cylindrically embodied magnet coils (44 and 48).

9. A device as defined by claim 7, in which said sheaths (66, 67, 68, 69) are disposed coaxially with the piston (5).

10. A device as defined by claim 9, in which said sheaths (66, 67, 68, 69) are actuatable by cylindrically embodied magnet coils (44 and 48).

11. A device as defined by claim 1, in which said sheaths (66, 67, 68, 69) are actuatable by cylindrically embodied magnet coils (44 and 48).

12. A device as defined by claim 1, which includes at least one transverse hole (108) in a wall of at least one of the sheaths (66, 67, 68, 69).

13. A device as defined by claim 12, in which the wall of at least one sheath in the vicinity of at least one transverse hole (108) tapers off at least partly in blade-like fashion.

14. A device as defined in claim 1, in which said plurality of check valves (101, 102) include a first check valve (101) and a second check valve (102), said first check valve is subjected to fluid pressure in said first work chamber (11) and said second check valve (102) is subjected to fluid pressure in said second work chamber (12).

15. A device as defined by claim 1, in which a top plate (31) of said piston includes a first bore (118) and a bottom plate (36) includes a second bore (119) through which fluid can flow between said first and second chambers (11 and 12) in the event said at least one basic damping throttle valve (115) and said at least one supplementary damping throttle valve (116) are stuck closed.

* * * * *